(12) United States Patent
Shellenbaum et al.

(10) Patent No.: US 9,796,540 B1
(45) Date of Patent: Oct. 24, 2017

(54) SYSTEM AND METHOD FOR ROBOTIC PALLETIZATION OF PACKAGES SUSCEPTIBLE TO PACKAGE-TO-PACKAGE DIMENSIONAL CREEP

(75) Inventors: Stephen S. Shellenbaum, Mound, MN (US); Douglas A. Brase, Owatonna, MN (US)

(73) Assignee: THIELE TECHNOLOGIES, Minneapolis, MN (US)

( * ) Notice: Subject to any disclaimer, the term of this patent is extended or adjusted under 35 U.S.C. 154(b) by 519 days.

(21) Appl. No.: 12/826,890

(22) Filed: Jun. 30, 2010

(51) Int. Cl.
*B65G 67/04* (2006.01)
*B65G 57/03* (2006.01)

(52) U.S. Cl.
CPC ............. *B65G 67/04* (2013.01); *B65G 57/03* (2013.01)

(58) Field of Classification Search
CPC ...... B65H 2301/42261; B65H 2220/01; B65H 2511/13; B65G 57/035
USPC ......... 270/58.04; 271/213; 414/790.5, 791.6, 414/792.6, 792.7, 792.8, 792.9, 793, 414/793.4, 793.5, 793.6, 793.7, 793.8, 414/794.2, 794.3, 794.5, 794.6, 794.7, 414/794.8, 799, 923, 924; 700/217, 245, 700/250, 253; 901/35, 46, 9
See application file for complete search history.

(56) References Cited

U.S. PATENT DOCUMENTS

| | | |
|---|---|---|
| 2,689,082 A | 9/1954 | Kolisch |
| 2,708,368 A | 5/1955 | Kolisch |
| 3,586,176 A | 6/1971 | Rackman et al. |
| 3,588,480 A | 6/1971 | Unger et al. |
| 3,593,860 A * | 7/1971 | Brenner ..................... 414/793.5 |
| 3,696,945 A * | 10/1972 | Bobolts ..................... 414/790.7 |
| 3,850,313 A | 11/1974 | Rackman et al. |
| 4,194,343 A * | 3/1980 | Myers ................... B65B 25/046 198/524 |
| 4,301,641 A * | 11/1981 | McElwain .............. B65B 5/105 414/295 |
| 4,419,384 A | 12/1983 | Kane et al. |

(Continued)

FOREIGN PATENT DOCUMENTS

| | | |
|---|---|---|
| EP | 0746520 B1 | 3/1998 |
| EP | 1034124 B1 | 6/2002 |

(Continued)

OTHER PUBLICATIONS

"Fairbank's Controls Operation", Operator's Manual for Defense Depot Ogden, W.O. Number 45334, Reg No. 15-373808, Feb. 4, 1985.

*Primary Examiner* — Gregory Adams
(74) *Attorney, Agent, or Firm* — Sherrill Law Offices, PLLC

(57) ABSTRACT

A system and associated method for palletizing fluid filled flexible packages. The system includes a platform, a distance sensor, a robotic arm palletizer and a controller. The platform is configured and arranged with a support surface for supporting a fluid filled flexible package. The distance sensor is disposed above the support surface of the platform and faces downward towards the support surface for taking distance readings. The robotic arm palletizer is operable for palletizing fluid filled flexible packages according to a preprogrammed stacking protocol that includes a drop-off height dimension. The controller is in electrical communication with the distance sensor and the robotic arm for establishing or adjusting the drop-off height dimension based upon distance readings from the distance sensor.

21 Claims, 4 Drawing Sheets

(56) References Cited

U.S. PATENT DOCUMENTS

| | | | |
|---|---|---|---|
| 4,597,707 A * | 7/1986 | Cornacchia | 414/792 |
| 4,871,052 A | 10/1989 | Huber | |
| 5,042,015 A | 8/1991 | Stringer | |
| 5,105,392 A | 4/1992 | Stringer et al. | |
| 5,201,630 A * | 4/1993 | Ishida et al. | 414/744.5 |
| RE35,066 E * | 10/1995 | Martin | 414/799 |
| 5,484,049 A | 1/1996 | Huang et al. | |
| 5,505,291 A | 4/1996 | Huang et al. | |
| 5,908,283 A | 6/1999 | Huang et al. | |
| 6,003,438 A * | 12/1999 | Schwede | 100/4 |
| 6,120,241 A | 9/2000 | Huang et al. | |
| 6,201,203 B1 | 3/2001 | Tilles | |
| 6,286,856 B1 | 9/2001 | Rocca | |
| 6,290,452 B1 * | 9/2001 | Wachter | B65H 1/30 414/626 |
| 6,298,009 B1 | 10/2001 | Stringer | |
| 6,579,053 B1 | 6/2003 | Grams et al. | |
| 6,699,007 B2 | 3/2004 | Huang et al. | |
| 6,783,317 B2 | 8/2004 | Claeys | |
| 6,850,464 B2 | 2/2005 | Carlsruh et al. | |
| 6,866,471 B2 | 3/2005 | Grams et al. | |
| 7,210,894 B2 | 5/2007 | Huang et al. | |
| 2002/0106273 A1 * | 8/2002 | Huang et al. | 414/788.1 |
| 2002/0106276 A1 | 8/2002 | Tomita et al. | |
| 2004/0165980 A1 | 8/2004 | Huang et al. | |
| 2007/0031235 A1 * | 2/2007 | Nielsen | 414/788.1 |
| 2008/0008573 A1 | 1/2008 | Mitchell | |
| 2009/0028686 A1 | 1/2009 | Tallis et al. | |
| 2009/0110525 A1 | 4/2009 | Criswell et al. | |

FOREIGN PATENT DOCUMENTS

| | | | |
|---|---|---|---|
| EP | 1211203 A2 | 6/2002 | |
| EP | 1489025 A2 | 12/2004 | |
| EP | 2036682 A2 | 3/2009 | |
| JP | 02215621 A * | 8/1990 | B65G 67/04 |
| WO | 95/22499 A1 | 8/1995 | |
| WO | 98/23511 A3 | 6/1998 | |
| WO | 2009/014677 A1 | 1/2009 | |

* cited by examiner

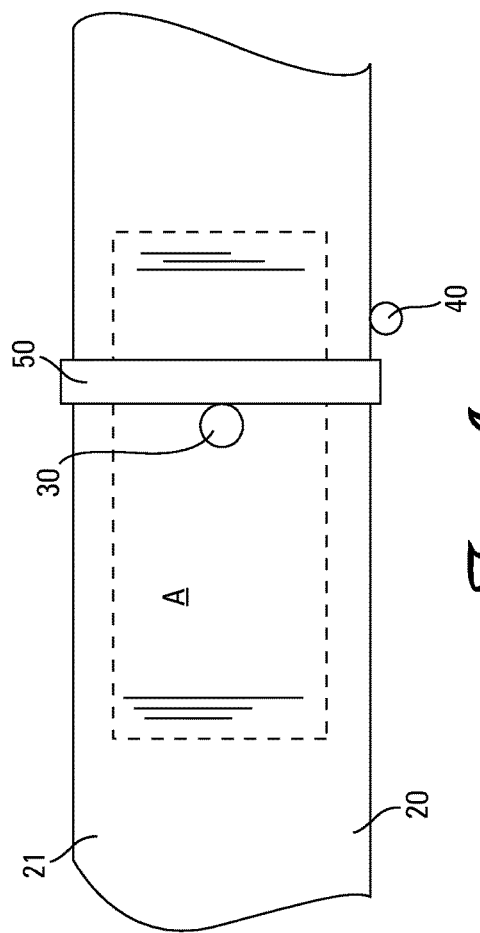
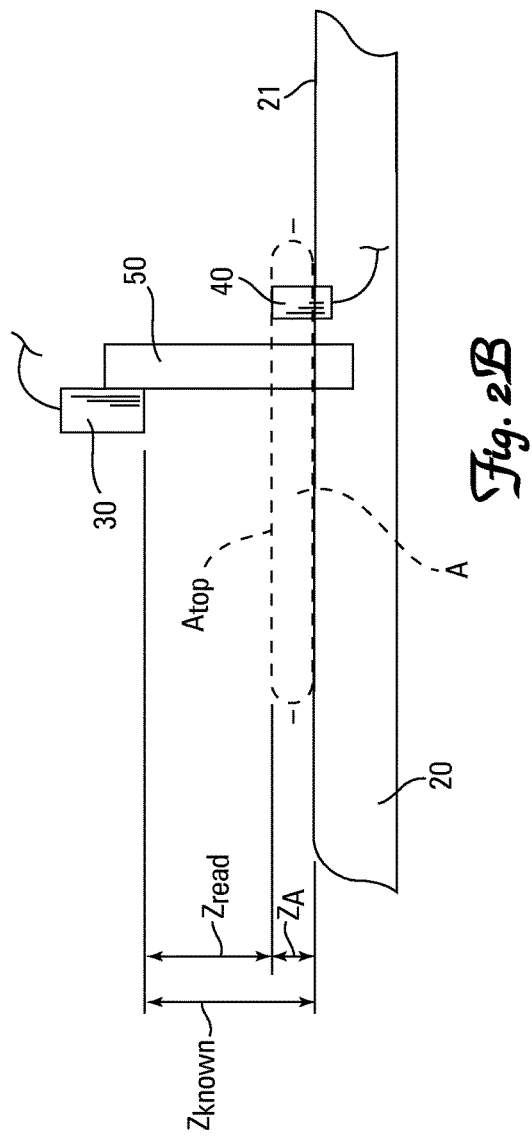
Fig. 2A
Fig. 2B

SYSTEM AND METHOD FOR ROBOTIC PALLETIZATION OF PACKAGES SUSCEPTIBLE TO PACKAGE-TO-PACKAGE DIMENSIONAL CREEP

BACKGROUND

Robotic swing arms are widely used throughout the world to palletize a wide variety of packaged goods. Swing arm robots suitable for such use are available from a number of suppliers including specifically, but not exclusively, Kuka Robotics Corp of Augsburg, Germany; Fuji Robotics of Redmond, Wash., Fanuc Robotics of Rochester Hills, Mich., and Motoman Robotics Division of Yaskawa America, Inc. of West Carrollton, Ohio.

To achieve proper palletization of packages, the movement of swing arm robots is controlled by a protocol that includes x-y-z dimensional values based primarily upon the three-dimensional relationship between the fixed-position base of the swing arm robot, a fixed-position pick-up location for packages to be palletized, and a fixed-position pre-established drop-off location for each package onto the pallet.

In order to prevent the packages and/or their contents from being damaged during palletization, and also prevent the packages from bouncing or sliding out of position on the stack, swing arm robots are typically programmed and controlled so that they drop each package a minimal distance (e.g., an inch or so) onto the pallet or the immediately underlying layer of palletized packages. To achieve this, the drop height or z-dimension of the robotic swing arm is adjusted based upon the height of the current layer of packages being placed on the pallet. This is typically achieved by manually measuring one of the packages being palletized prior to initiating the palletization process, and inputting this value into the control system for the swing arm robot.

Despite such efforts, the palletization of fluid filled flexible packages (e.g., 50 lb bags of dog food or 20 lb bags of powdered milk) remain susceptible to package misalignment and loss of stack integrity due to shifting, sliding and bouncing of the packages as they are dropped onto the stack.

Accordingly, a need exist for a system and a method of automatically palletizing fluid filled flexible packages that minimizes misalignment of the stacked packages during palletization and thereby reduces the toppling, collapse or other structural failure of a palletized stack of the packages.

SUMMARY OF THE INVENTION

A first aspect of the invention is a system for palletizing fluid filled flexible packages. The system includes a platform, a distance sensor, a robotic arm palletizer and a controller. The platform is configured and arranged with a support surface for supporting a fluid filled flexible package. The distance sensor is disposed above the support surface of the platform and faces downward towards the support surface for taking distance readings. The robotic arm palletizer is operable for palletizing fluid filled flexible packages according to a preprogrammed stacking protocol that includes a drop-off height dimension. The controller is in electrical communication with the distance sensor and the robotic arm for establishing or adjusting the drop-off height dimension based upon distance readings from the distance sensor.

A second aspect of the invention is a method for palletizing fluid filled flexible packages. The method includes the steps of (A) placing a fluid filled flexible package onto a surface of a platform, (B) determining a height dimension of the placed fluid filled flexible package by ascertaining a first distance between a distance sensor mounted a known distance above the surface of the platform and a top surface of the placed fluid filled flexible package and subtracting the first distance from the known distance, (C) palletizing a plurality of fluid filled flexible packages, including at least one fluid filled flexible package whose height dimension has been determined, with a robotic arm palletizer according to a preprogrammed stacking protocol that includes a drop-off height dimension, and (D) establishing or adjusting the drop-off height dimension of the stacking protocol based upon the determined height dimension of the placed fluid filled flexible package.

BRIEF DESCRIPTION OF THE DRAWINGS

FIG. 2A is an enlarged top view of the height sensing station of the invention as depicted in FIG. 1 with a fluid filled flexible package passing therethrough.

FIG. 2B is an enlarged side view of the height sensing station of the invention as depicted in FIG. 1 with a fluid filled flexible package passing therethrough.

DETAILED DESCRIPTION OF A PREFERRED EMBODIMENT

Definitions

As utilized herein, including the claims, the term "fluid" refers to any amorphous matter that tends to flow and conform to the outline of its container, including specifically but not exclusively gases, liquids and particulate solids.

As used herein, including the claims, the phrase "drop-off height dimension" means the vertical height above a reference plane at which a robotic arm positions and releases a payload.

NOMENCLATURE

10 Automated Flexible Package Palletization System
12 Height Sensing Station
14 Palletizing Station
20 Platform or Conveyor
21 Support Surface of Platform
30 Distance Sensor
40 Presence Sensor
50 Gantry
60 Robotic Arm Palletizer
61 Tines or Plate on the Robotic Arm for Contacting and Supporting a Package
70 Controller
$Z_0$ Base or Ground Level
$Z_A$ Height of Package
$Z_{drop}$ Drop-off Height
$Z_{gap}$ Drop-off Gap $Z_{known}$ Distance from Distance Sensor to Support Surface of Platform
$Z_{read}$ Distance between Sensor and Top Surface of Package A Fluid Filled Flexible Package
$A_{top}$ Top Surface of Fluid Filled Flexible Package
$A_n$ $n^{th}$ Layer of Fluid Filled Flexible Packages
B Pallet

DESCRIPTION

Construction

Figure 1:
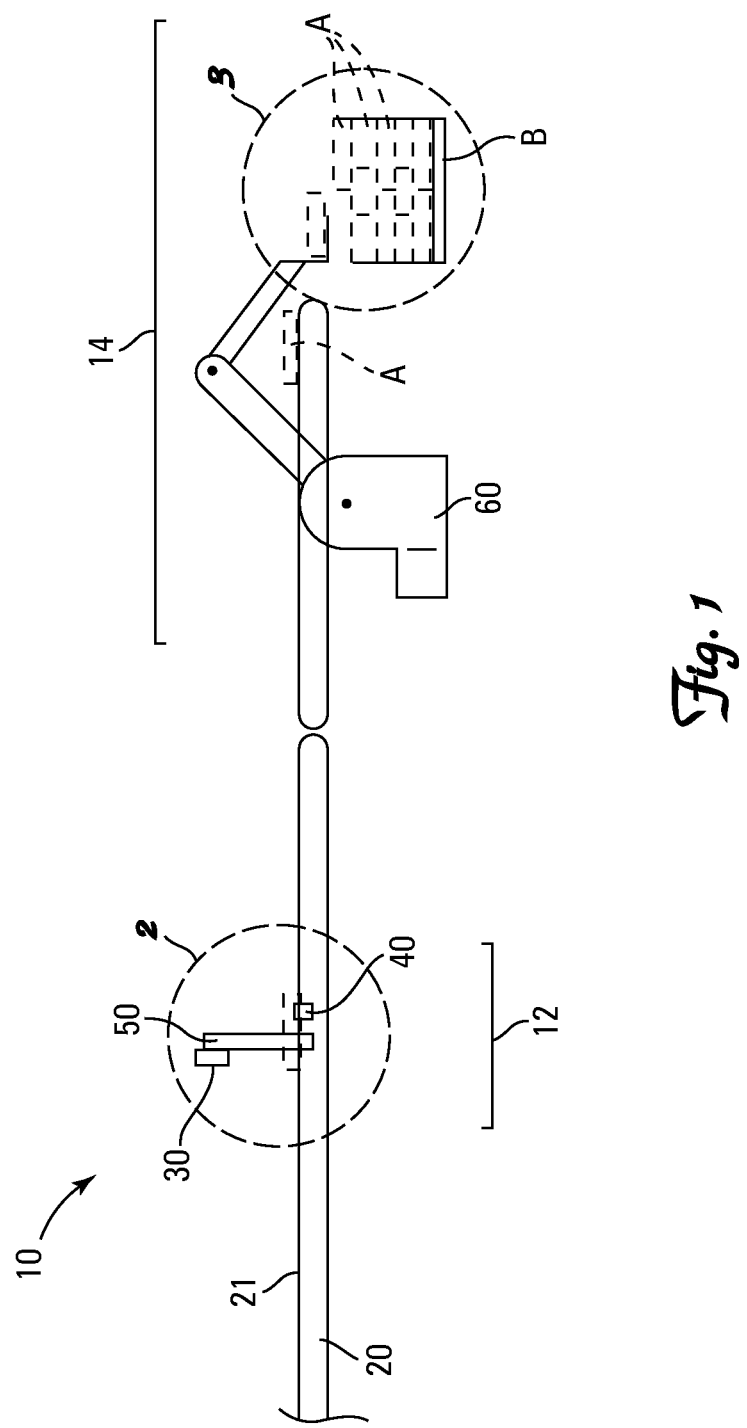
FIG. 1 is a side view of one embodiment of the invention with a partially constructed pallet of stacked fluid filled flexible packages.

Referring generally to FIG. 1, a first aspect of the invention is directed to a system 10 with a height sensing station 12 and a palletizing station 14 for palletizing fluid filled flexible packages A. The system 10 includes a platform 20, a distance sensor 30, a robotic arm palletizer 60 and a controller 70.

Referring to FIGS. 1, 2A and 2B, the platform 20 is configured and arranged with an upper support surface 21 for supporting a fluid filled flexible package A. The platform 20 is preferably a conveyor effective for transporting fluid filled flexible packages A through the height sensing station 12 and delivering the packages A to the palletizing station 14. The conveyor may be selected from any of the well know types of conveyors including specifically, but not exclusively, chute conveyors, wheel conveyors, gravity roller conveyors, driven roller conveyors, chain conveyors, flat belt conveyors, ball transfer tables, etc. The platform 20 preferably provides a horizontally flat area immediately underneath the distance sensor 30.

Referring to FIGS. 1, 2A and 2B, the distance sensor 30 is disposed above the support surface 21 of the platform 20 and faces downward towards the support surface 21 for taking distance readings. The distance sensor 30 may be selected from any of the well known distance sensors including specifically but not exclusively ultrasonic distance sensors, such as those available from Banner Engineering Corporation of Minneapolis, Minn., and laser distance sensors, such as those available from Banner Engineering Corporation of Minneapolis, Minn. It is also possible, but less desired, to take distance readings by employing an array of presence sensors such as disclosed in U.S. Pat. Nos. 5,105,392, 5,220,536, and 5,422,861, or a mechanical sizing device, such as disclosed in U.S. Pat. Nos. 2,689,082, 2,708,368, 2,812,904 and 3,154,673.

A presence sensor 40 is optionally but preferably provided for triggering the distance sensor 30 to take a reading when a package A is located underneath the distance sensor 30. Alternatively, the system 10 can function without a presence sensor 40 by allowing the distance sensor 30 to continuously take distance readings (e.g., several times a second) with only those distance readings showing a meaningful difference from either the previous distance reading or the known distance $Z_{known}$ between the distance sensor 30 and the support surface 21 of the platform 20, treated as a reading taken with a package A positioned underneath the distance sensor 30.

The system 10 can be programmed to take a reading and determine the height $Z_A$ for all or only some of the fluid filled flexible packages A palletized by the robotic arm 60, with a preference for taking a reading and determining the height $Z_A$ for at least one and preferably two or three fluid filled flexible packages A stacked into each completed pallet.

When an ultrasonic or laser distance sensor is employed as the distance sensor 30, the distance measured by the distance sensor 30 is not the height of a package A located underneath the distance sensor 30. Rather, the distance sensor 30 measures the distance $Z_{read}$ between the distance sensor 30 and the top surface $A_{top}$ of the package A underneath the distance sensor 30. Knowledge of $Z_{read}$ allows the height $Z_A$ of the package A to be calculated by subtracting the measured distance $Z_{read}$ from the distance $Z_{known}$ between the distance sensor 30 and the support surface 21 of the platform 20 (a static value).

$$Z_A = Z_{known} - Z_{read} \tag{1}$$

Referring to FIGS. 1, 2A and 2B, the distance sensor 30 may be conveniently and sturdily secured a fixed distance above the support surface 21 of the platform 20 on a gantry 50 attached to the frame (unnumbered) of the platform 20. Other support structures may also be used, including specifically but not exclusively a stanchion (not shown) attached to the frame (unnumbered) of the platform 20 with a cantilevered arm (not shown) extending over the platform 20 from the upper end of the stanchion, or a stand-alone gantry or cantilevered arm extending from a stand (not shown) that is not attached to the frame of the platform 20.

Figure 3:
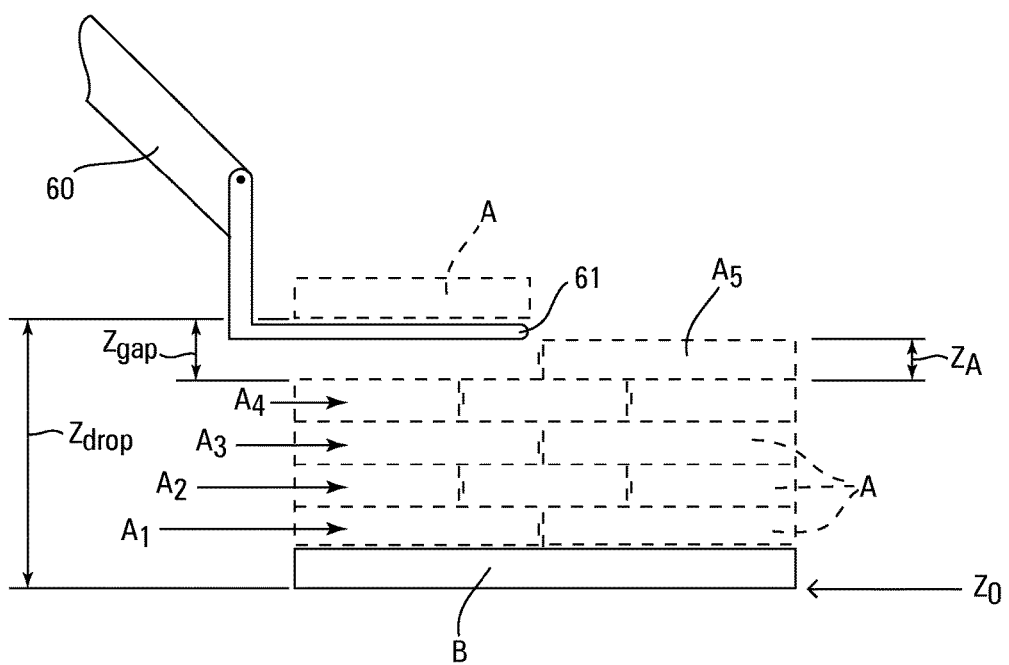
FIG. 3 is an enlarged side view of the partially constructed pallet of stacked fluid filled flexible packages as depicted in FIG. 1 with a robotic arm positioned to drop a fluid filled flexible package into place atop the stack.

Referring to FIGS. 1 and 3, the robotic arm palletizer 60 is operable for palletizing fluid filled flexible packages A according to a preprogrammed stacking protocol that includes a drop-off height dimension $Z_{drop}$. The drop-off height $Z_{drop}$ can be measured from any fixed point or surface on the robotic arm palletizer 60 that remains in a fixed spatial relationship relative to a package A being carried by the robotic arm palletizer 60. As shown in FIG. 3, the drop-off height $Z_{drop}$ is preferably measured from the upper surface (unnumbered) of the package supporting tines or plate 61 on the robotic arm palletizer 60.

Robotic arm palletizers 60 suitable for use in the present invention are available from a number of suppliers, including specifically but not exclusively, Kuka Robotics Corp of Augsburg, Germany; Fuji Robotics of Redmond, Wash., Fanuc Robotics of Rochester Hills, Mich., and Motoman Robotics Division of Yaskawa America, Inc. of West Carrollton, Ohio.

Computer implemented protocols for palletized stacking of fluid filled flexible packages A are widely used, well known and well understood by those having routine skill in the art of automated palletization.

Figure 4:
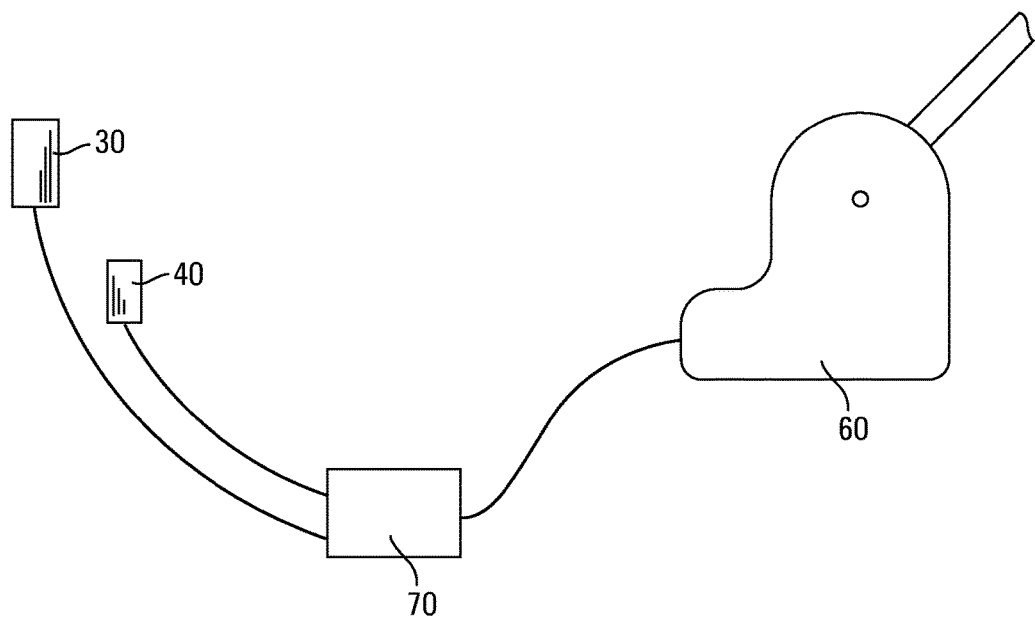
FIG. 4 is a macro schematic diagram for the electronic interconnections of the invention as depicted in FIG. 1.

Referring to FIG. 4, the controller 70, such as a microcontroller or a PCU, is in electrical communication with the robotic arm palletizer 60 for controlling movement of the robotic arm palletizer 60 in accordance with a stacking protocol. The controller 70 is also in electrical communication with the distance sensor 30 and the optional presence sensor 40 for receiving distance readings from the distance sensor 30 from which the height $Z_A$ of the package A being conveyed to the robotic arm palletizer 60 can be ascertained. This information allows the drop-off height $Z_{drop}$ to either be established or adjusted to reflect the actual height $Z_A$ of the packages A being conveyed to the palletizing station 14.

The system 10 is particularly useful when the flexible packages A are filled by weight rather than volume as changes in density of the fluid being packaged—a common occurrence when the fluid is a solid particulate being packaged from a large storage bin or storage tower that places gradually increasing compressive forces on the particles towards the bottom of the bin or tower—can result in significant dimensional changes in the filled flexible package A.

Example 1

Flexible packages A filled with 80 lbs of dog food are transported to a palletizing station 14 by a conveyor 20. The palletizing station 14 includes a pallet B and a robotic arm palletizer 60. Data regarding the height $Z_B$ of the pallet B, and the desired drop-off gap $Z_{gap}$ (i.e., the vertical distance each package A will fall when dropped onto the pallet B by the robotic arm palletizer 60) are input into the controller 70 for the robotic arm palletizer 60 via a user interface unit (not shown).

A distance sensor 30 positioned above in the conveyor 20 is triggered to take a distance reading for purposes of measuring the distance between the distance sensor 30 and the support surface 21 of the platform 20. This distance is recorded in computer memory as a fixed known distance $Z_{known}$.

A filled flexible package A is placed on the conveyor 20 and conveyed towards the palletizing station 14. As the package A passes underneath the distance sensor 30, a presence sensor 40 detects presence of the package A and triggers the distance sensor 30 to take a distance reading $Z_{read}$, constituting the vertical distance between the distance sensor 30 and the top surface $A_{top}$ of the package A.

The height $Z_A$ of the package A is calculated by the controller 70 using equation (1) below:

$$Z_A = Z_{known} - Z_{read} \quad (1)$$

The calculated height $Z_A$ of the package A is stored in computer memory and used by the stacking protocol to determine the drop-off height $Z_{drop}$ (i.e., the vertical distance above ground level $Z_0$ at which packages A are to be positioned when dropped onto the pallet) for each layer of fluid filled flexible packages A stacked onto the pallet B in accordance with the following equation (2).

$$Z_{drop} = Z_B + Z_{gap} + (n-1)Z_A \quad (1)$$

wherein;

n=the layer into which the package A is to be placed.

An exemplary data set of calculated $Z_{drop}$ and actual drop distance $Z_{gap}$ for each layer of fluid filled flexible packages A having a measured height $Z_A$ of 3.2 inches being stacked onto a pallet having a height $Z_B$ of 4 inches with a desired drop distance $Z_{gap}$ of 1.5 inches is provided below in Table One.

TABLE ONE

| LAYER | $Z_{DROP}$ | $Z_{GAP}$ (Actual) |
|---|---|---|
| 1 | 5.5 | 1.5 |
| 2 | 8.7 | 1.5 |
| 3 | 11.9 | 1.5 |
| 4 | 15.1 | 1.5 |
| 5 | 18.3 | 1.5 |
| 6 | 21.5 | 1.5 |
| 7 | 24.7 | 1.5 |
| 8 | 27.9 | 1.5 |
| 9 | 31.1 | 1.5 |
| 10 | 34.3 | 1.5 |
| 11 | 37.5 | 1.5 |
| 12 | 40.7 | 1.5 |

Example 2

(Decrease in Fluid Density Resulting in an Increase in Package Height $Z_A$)

Comparative data sets for values of $Z_{drop}$ and actual drop distance $Z_{gap}$ for each layer of weight-filled fluid filled flexible packages A is provided in Table Two below for a situation where the height of the packages A being stacked in accordance with a stacking protocol has changed over time from an original height $Z_A$ of 3.0 inches to a current height $Z_A$ of 3.2 inches due to a decrease in density of the fluid contained in the weight-filled packages A. As with Example 1, the packages A are being stacked onto a pallet having a height $Z_B$ of 4 inches and the desired drop distance $Z_{gap}$ is 1.5 inches. The first data set employs a stacking protocol that continues stacking based upon an assumption that the height $Z_A$ of the packages A remains unchanged at 3.0 inches. The second data set employs a stacking protocol that employs updated values for the height $Z_A$ of the packages A obtained from a height sensing station 12.

TABLE TWO

| | $Z_A$ ASSUMED UNCHANGED (3.0 inches) | | $Z_A$ UPDATED (3.2 inches) | |
|---|---|---|---|---|
| LAYER | $Z_{DROP}$ | $Z_{GAP}$ (Actual) | $Z_{DROP}$ | $Z_{GAP}$ (Actual) |
| 1 | 5.5 | 1.5 | 5.5 | 1.5 |
| 2 | 8.5 | 1.3 | 8.7 | 1.5 |
| 3 | 11.5 | 1.1 | 11.9 | 1.5 |
| 4 | 14.5 | 0.9 | 15.1 | 1.5 |
| 5 | 17.5 | 0.7 | 18.3 | 1.5 |
| 6 | 20.5 | 0.5 | 21.5 | 1.5 |
| 7 | 23.5 | 0.3 | 24.7 | 1.5 |
| 8 | 26.5 | 0.1 | 27.9 | 1.5 |
| 9 | 29.5 | −0.1 | 31.1 | 1.5 |
| 10 | 32.5 | −0.3 | 34.3 | 1.5 |
| 11 | 35.5 | −0.5 | 37.5 | 1.5 |
| 12 | 40.7 | −0.7 | 40.7 | 1.5 |

As shown by the data in Table Two, the actual drop distance $Z_{gap}$ remains constant when the present invention is employed, while a stacking failure is imminent when package height $Z_A$ is not updated as the robotic arm 60 will begin contacting and knocking off packages A from previously stacked layers around layer 7 or 8.

Example 3

(Increase in Fluid Density Resulting in a Decrease in Package Height $Z_A$)

Comparative data sets for values of $Z_{drop}$ and actual drop distance $Z_{gap}$ for each layer of weight-filled fluid filled flexible packages A is provided in Table Three below for a situation where the height of the packages A being stacked in accordance with a stacking protocol has changed over time from an original height $Z_A$ of 3.0 inches to a current height $Z_A$ of 2.6 inches due to an increase in density of the fluid contained in the weight-filled packages A. As with Example 2, the packages A are being stacked onto a pallet having a height $Z_B$ of 4 inches and the desired drop distance $Z_{gap}$ is 1.5 inches. The first data set employs a stacking protocol that continues stacking based upon an assumption that the height $Z_A$ of the packages A remains unchanged at 3.0 inches. The second data set employs a stacking protocol that employs updated values for the height $Z_A$ of the packages A obtained from a height sensing station 12.

TABLE THREE

| | $Z_A$ ASSUMED UNCHANGED (3.0 inches) | | $Z_A$ UPDATED (3.2 inches) | |
|---|---|---|---|---|
| LAYER | $Z_{DROP}$ | $Z_{GAP}$ (Actual) | $Z_{DROP}$ | $Z_{GAP}$ (Actual) |
| 1 | 5.5 | 1.5 | 5.5 | 1.5 |
| 2 | 8.5 | 1.9 | 8.1 | 1.5 |

TABLE THREE-continued

| | $Z_A$ ASSUMED UNCHANGED (3.0 inches) | | $Z_A$ UPDATED (3.2 inches) | |
| --- | --- | --- | --- | --- |
| LAYER | $Z_{DROP}$ | $Z_{GAP}$ (Actual) | $Z_{DROP}$ | $Z_{GAP}$ (Actual) |
| 3 | 11.5 | 2.3 | 10.7 | 1.5 |
| 4 | 14.5 | 2.7 | 13.3 | 1.5 |
| 5 | 17.5 | 3.1 | 15.9 | 1.5 |
| 6 | 20.5 | 3.5 | 18.5 | 1.5 |
| 7 | 23.5 | 3.9 | 21.1 | 1.5 |
| 8 | 26.5 | 4.3 | 23.7 | 1.5 |
| 9 | 29.5 | 4.7 | 26.3 | 1.5 |
| 10 | 32.5 | 5.1 | 28.9 | 1.5 |
| 11 | 35.5 | 5.5 | 31.5 | 1.5 |
| 12 | 40.7 | 5.9 | 34.1 | 1.5 |

As shown by the data in Table Three, the actual drop distance $Z_{gap}$ remains constant when the present invention is employed, while stacks created by assuming an unchanged package height $Z_A$ are prone to stacking failure as the gradually increasing actual drop distance $Z_{gap}$ will produce ever more pronounced bouncing of dropped packages A—resulting in packages A dropped onto the stack sliding toward the edges of the stack with some packages A sliding completely off the stack.

We claim:

1. A system for palletizing fluid filled flexible packages onto a pallet, comprising:
   (a) a platform configured and arranged with a support surface for supporting a fluid filled flexible package,
   (b) a downwardly facing distance sensor disposed a fixed distance above the support surface of the platform operable for taking distance readings,
   (c) a robotic arm palletizer operable for palletizing fluid filled flexible packages according to a preprogrammed stacking protocol that includes a drop-off height dimension from which packages are released for free-fall deposit onto the pallet, and
   (d) a controller in electrical communication with the distance sensor and the robotic arm for establishing or adjusting the drop-off height dimension based upon the value of the distance readings obtained from the distance sensor when a fluid filled flexible package is situated on the support surface below the sensor.

2. The system of claim 1, wherein the fluid filled flexible packages are filled to weight.

3. The system of claim 2, wherein the fluid in the fluid filled flexible packages is susceptible to a package-to-package variation in density.

4. The system of claim 3, wherein the fluid filled flexible packages are susceptible to package-to-package dimensional creep over time.

5. The system of claim 1, wherein the platform is a conveyor.

6. The system of claim 5, wherein the conveyor is a driven conveyor.

7. The system of claim 1, wherein the distance sensor is supported directly above the support surface of the platform on a stationary cantilevered arm or gantry.

8. The system of claim 1, wherein the distance sensor is an ultrasonic sensor or a laser distance sensor.

9. The system of claim 2, wherein the controller establishes a drop-off height dimension for each layer of fluid filled flexible packages with the drop-off height dimension of at least some of the layers established or adjusted based upon a height dimension of selected fluid filled flexible packages determined by taking a distance reading to ascertain a first distance between the distance sensor and a top surface of a fluid filled flexible package placed upon the support surface of the platform underneath the sensor, and subtracting the first distance from a known distance between the sensor and the support surface of the platform.

10. The system of claim 9, wherein a height dimension is determined for all fluid filled flexible packages palletized by the robotic arm.

11. The system of claim 9, wherein a height dimension is determined for at least one but less than three fluid filled flexible packages on each complete pallet that is palletized by the robotic arm.

12. The system of claim 1, further comprising a presence sensor in electrical communication with the controller for sensing presence of a fluid filled flexible package underneath the distance sensor and transmitting an electrical presence signal to the controller when such presence is detected, wherein the controller is operable for triggering the distance sensor to take a distance reading when the presence signal is received.

13. A method for palletizing fluid filled flexible packages onto a pallet, comprising:
   (a) placing a fluid filled flexible package onto a surface of a platform,
   (b) determining a height dimension of the placed fluid filled flexible package by ascertaining a first distance between a distance sensor mounted a known and fixed distance above the surface of the platform and a top surface of the placed fluid filled flexible package and subtracting the first distance from the known distance,
   (c) palletizing a plurality of fluid filled flexible packages, including at least one fluid filled flexible package whose height dimension has been determined, with a robotic arm palletizer according to a preprogrammed stacking protocol that includes a drop-off height dimension,
   (d) establishing or adjusting the drop-off height dimension of the stacking protocol based upon the determined height dimension of the placed fluid filled flexible package, and
   (e) releasing packages for free-fall deposit onto the pallet from the established or adjusted drop-off height dimension.

14. The method of claim 13, wherein the fluid filled flexible packages are filled to weight and sealed prior to placement onto the platform.

15. The method of claim 14, wherein the fluid in the fluid filled flexible packages is susceptible to a package-to-package variation in density.

16. The method of claim 15, wherein the fluid filled flexible packages are susceptible to package-to-package dimensional creep over time.

17. The method of claim 13, wherein the height of the fluid filled flexible package is determined as the package is conveyed.

18. The method of claim 13, wherein the height dimension of the fluid filled flexible package is determined with an ultrasonic sensor or a laser distance sensor.

19. The method of claim 13, wherein the height dimension is determined for all fluid filled flexible packages palletized by the robotic arm.

20. The method of claim 13, wherein the height dimension is determined for at least one but less than three fluid filled flexible packages on each complete pallet that is palletized by the robotic arm.

21. The method of claim 13, further comprising the steps of (i) detecting presence of a fluid filled flexible package underneath the distance sensor, and (ii) triggering the distance sensor to take a distance measurement when such presence is detected.

* * * * *